United States Patent
Huzzard Cunningham (10) Patent No.: US 8,635,875 B2
(45) Date of Patent: Jan. 28, 2014

(54) GAS TURBINE ENGINE EXHAUST MIXER INCLUDING CIRCUMFERENTIALLY SPACED-APART RADIAL ROWS OF TABS EXTENDING DOWNSTREAM ON THE RADIAL WALLS, CRESTS AND TROUGHS

(75) Inventor: Mark Huzzard Cunningham, Montreal (CA)

(73) Assignee: Pratt & Whitney Canada Corp., Longueuil, QC (CA)

( * ) Notice: Subject to any disclaimer, the term of this patent is extended or adjusted under 35 U.S.C. 154(b) by 782 days.

(21) Appl. No.: 12/770,117

(22) Filed: Apr. 29, 2010

(65) Prior Publication Data

US 2011/0265447 A1 Nov. 3, 2011

(51) Int. Cl.
*F02K 9/97* (2006.01)

(52) U.S. Cl.
USPC ............................. 60/770; 60/262; 181/213

(58) Field of Classification Search
USPC ................... 60/770, 39.5, 262, 226.1–226.3; 181/213; 239/265.39, 265.19
See application file for complete search history.

(56) References Cited

U.S. PATENT DOCUMENTS

| | | | |
|---|---|---|---|
| 2,948,115 A | 8/1960 | Dunsworth et al. | |
| 2,959,917 A | 11/1960 | McGehee | |
| 2,971,327 A | 2/1961 | Moy et al. | |
| 2,979,151 A | 4/1961 | Blackwell et al. | |
| 3,002,341 A * | 10/1961 | Muzzy et al. | 239/265.17 |
| 3,153,319 A * | 10/1964 | Lilley et al. | 239/265.19 |
| 3,185,252 A | 5/1965 | Lemmerman | |
| 3,215,172 A | 11/1965 | Ardoin | |
| 3,227,240 A * | 1/1966 | Lee et al. | 181/217 |
| 3,568,792 A * | 3/1971 | Urquhart | 181/215 |
| 3,568,794 A * | 3/1971 | Hilbig | 181/215 |
| 3,572,464 A | 3/1971 | MacDonald | |
| 3,592,291 A * | 7/1971 | Medawar et al. | 181/220 |
| 3,861,140 A | 1/1975 | Krabacher | |
| 4,051,671 A | 10/1977 | Brewer | |
| 4,077,206 A | 3/1978 | Ayyagari | |
| 4,117,671 A | 10/1978 | Neal et al. | |

(Continued)

FOREIGN PATENT DOCUMENTS

| CA | 2738100 A1 | 10/2011 |
|---|---|---|
| DE | 19909792 A1 | 9/2000 |

(Continued)

OTHER PUBLICATIONS

McBean, S.F.; Birk,A.M., "Optimizing the Peformance of Air-Air Ejectors With Triangular Tabbed Driving Nozzles", Proceedings of GT2007, ASME Turbo Expo 2007: Power for Land, Sea and Air, May 14-17, 2007, Montreal, Canada, GT2007-27413.

(Continued)

*Primary Examiner* — William H Rodriguez
*Assistant Examiner* — Carlos A Rivera
(74) *Attorney, Agent, or Firm* — Norton Rose Fulbright Canada LLP (57) ABSTRACT

A gas turbine engine exhaust mixer has a plurality of circumferentially distributed alternating inner and outer lobes. The outer lobes protrude into the annular bypass passage of the engine, whereas the inner lobes protrude into the main gas path passage of the engine. The inner and outer lobes respectively define alternating troughs and crest with radial interconnecting walls therebetween. The mixer has a jagged trailing edge including a plurality of tabs extending from each radial wall between the troughs and the crests.

14 Claims, 6 Drawing Sheets

(56) References Cited

U.S. PATENT DOCUMENTS

| | | | |
|---|---|---|---|
| 4,149,375 A | 4/1979 | Wynosky et al. | |
| 4,214,703 A | 7/1980 | Latham et al. | |
| 4,215,536 A | 8/1980 | Rudolph | |
| 4,244,441 A | 1/1981 | Tolman | |
| 4,280,587 A | 7/1981 | Bhat | |
| 4,284,170 A | 8/1981 | Larson et al. | |
| 4,311,291 A | 1/1982 | Gilbertson et al. | |
| 4,401,269 A * | 8/1983 | Eiler | 239/265.17 |
| 4,487,017 A | 12/1984 | Rodgers | |
| 4,543,784 A | 10/1985 | Kirker | |
| 4,548,034 A * | 10/1985 | Maguire | 60/262 |
| 4,576,002 A | 3/1986 | Mavrocostas | |
| 4,786,016 A | 11/1988 | Presz, Jr. et al. | |
| 4,817,379 A | 4/1989 | Bagley | |
| 4,836,469 A * | 6/1989 | Wagenfeld | 244/1 N |
| 4,934,481 A | 6/1990 | Friedrich | |
| 5,154,052 A | 10/1992 | Giffin, III et al. | |
| 5,291,672 A | 3/1994 | Brown | |
| 5,717,172 A | 2/1998 | Griffin, Jr. et al. | |
| 5,884,472 A | 3/1999 | Presz, Jr. et al. | |
| 5,924,632 A | 7/1999 | Seiner et al. | |
| 6,012,281 A | 1/2000 | Hauser | |
| 6,082,635 A | 7/2000 | Seiner et al. | |
| 6,276,127 B1 * | 8/2001 | Alberti | 60/262 |
| 6,314,721 B1 | 11/2001 | Mathews et al. | |
| 6,360,528 B1 * | 3/2002 | Brausch et al. | 60/262 |
| 6,487,848 B2 | 12/2002 | Zysman et al. | |
| 6,532,729 B2 | 3/2003 | Martens | |
| 6,578,355 B1 * | 6/2003 | Mundt | 60/262 |
| 6,606,854 B1 * | 8/2003 | Siefker et al. | 60/262 |
| 6,612,106 B2 | 9/2003 | Balzer | |
| 6,640,537 B2 | 11/2003 | Tse | |
| 6,705,547 B2 | 3/2004 | Braga Da Costa Campos | |
| 6,786,037 B2 | 9/2004 | Balzer | |
| 6,786,038 B2 | 9/2004 | Lair | |
| 6,935,098 B2 | 8/2005 | Bardagi et al. | |
| 6,969,028 B2 | 11/2005 | Dun | |
| 7,065,957 B2 | 6/2006 | Balzer | |
| 7,093,423 B2 | 8/2006 | Gowda et al. | |
| 7,114,323 B2 | 10/2006 | Schlinker et al. | |
| 7,305,817 B2 | 12/2007 | Blodgett et al. | |
| 7,310,939 B2 | 12/2007 | Prouteau et al. | |
| 7,392,651 B2 | 7/2008 | Goutines et al. | |
| 7,434,384 B2 | 10/2008 | Lord et al. | |
| 7,469,529 B2 | 12/2008 | Feuillard et al. | |
| 7,506,501 B2 | 3/2009 | Anderson et al. | |
| 7,520,124 B2 | 4/2009 | Narayanan et al. | |
| 7,543,452 B2 | 6/2009 | Reba et al. | |
| 7,581,384 B2 | 9/2009 | Au et al. | |
| 2,926,744 A1 | 4/2010 | Towle et al. | |
| 7,854,123 B2 | 12/2010 | Au et al. | |
| 7,926,285 B2 | 4/2011 | Tisdale et al. | |
| 7,963,099 B2 | 6/2011 | Renggli | |
| 7,966,824 B2 | 6/2011 | Mengle | |
| 8,087,250 B2 | 1/2012 | Gutmark et al. | |
| 8,104,260 B2 | 1/2012 | Girgis et al. | |
| 8,157,207 B2 | 4/2012 | Mengle et al. | |
| 2004/0244357 A1 | 12/2004 | Sloan | |
| 2009/0084111 A1 | 4/2009 | Aeberli et al. | |
| 2011/0126512 A1 | 6/2011 | Anderson | |

FOREIGN PATENT DOCUMENTS

| | | |
|---|---|---|
| DE | 69819441 | 12/2003 |
| DE | 69819441 T2 | 8/2004 |
| DE | 60125279 | 2/2007 |
| DE | 60125279 T2 | 5/2007 |
| DE | 602005021414 | 7/2010 |
| EP | 913567 B1 | 11/2003 |
| EP | 1076765 B1 | 6/2006 |
| EP | 1 731 747 A1 | 12/2006 |
| EP | 1160439 B1 | 12/2006 |
| EP | 1561939 B1 | 5/2010 |
| EP | 2383455 A2 | 11/2011 |
| GB | 2160265 A | 12/1985 |
| GB | 2160265 A * | 12/1985 |
| JP | 4293573 B2 | 7/2009 |
| RU | 2213240 C2 | 9/2003 |

OTHER PUBLICATIONS

McBean, S.F.; Birk,A.M., "CFD (Realizable K-E) and Cold-Flow Testing for the Design of Air-Air Ejectors With Triangular Tabbed Driving Nozzles", Proceedings of GT2007, ASME Turbo Expo 2007: Power for Land, Sea and Air, May 14-17, 2007, Montreal, Canada, GT2007-27632.

* cited by examiner

GAS TURBINE ENGINE EXHAUST MIXER INCLUDING CIRCUMFERENTIALLY SPACED-APART RADIAL ROWS OF TABS EXTENDING DOWNSTREAM ON THE RADIAL WALLS, CRESTS AND TROUGHS

TECHNICAL FIELD

The application relates generally to aircraft gas turbine engines and, more particularly, to gas turbine engine exhaust mixers thereof.

BACKGROUND OF THE ART

In turbofan engines, high velocity air from the turbofan core is mixed with low velocity air from the bypass duct, and this mixed air is then exhausted from the engine. Turbofan engines generally use exhaust mixers in order to increase the mixing of the high and low velocity fluid flows. Various different configurations of exhaust mixers have been used in order to increase the mixing of the fluid flows. For instance, it is known to use lobed-shaped exhaust mixers in order to provide an increase in the mixing of the core and bypass fluid flows. Increased mixing of the high and low velocity flows increases the performance of turbofan engines.

However, there remains a need for improvement mixing solutions.

SUMMARY

In one aspect, there is provided an exhaust mixer assembly for a gas turbine engine of the type having an outer annular passage coaxially surrounding a core passage, the exhaust mixer assembly comprising a duct surrounding the outer annular passage and extending to a duct exit, the outer and core passages coaxially communicating with a lobed exhaust mixer, the lobed exhaust mixer having and upstream end, a downstream end and a lobed annular wall extending therebetween, the lobed annular wall defining a plurality of circumferentially distributed alternating inner and outer lobes, the lobes having exits defining a mixing plane at which gases in the outer and core passages are mixed, the mixing plane being disposed upstream of the duct exit, the outer lobes protruding radially into the annular outer passage and the inner lobes protruding radially into the core passage, the inner lobes including troughs forming an inner radial portion thereof and the outer lobes including crests forming an outer radial portion thereof, adjacent inner and outer lobes having radial walls interconnecting adjacent troughs and crests, one radial wall being positioned between each trough and each crest, the downstream end of the lobed exhaust mixer including a jagged trailing edge including circumferentially spaced-apart radial rows of tabs extending in a downstream direction from the trailing edge of the radial walls of the inner and outer lobes between the troughs and the crests.

In another aspect, there is provided an exhaust mixer assembly for a gas turbine engine of the type having concentric inner and outer flowpaths, the exhaust mixer assembly comprising a duct circumscribing the outer flowpath and having a duct exit, and a lobed exhaust mixer coaxially communicating with the inner and outer flowpaths, the lobed exhaust mixer comprising an upstream end, a downstream end, and an annular wall extending therebetween and defining a plurality of circumferentially distributed alternating inner and outer lobes, the lobes having exits defining a mixing plane at which gases flowing through the outer and inner flowpaths are mixed, the mixing plane being disposed upstream of the duct exit, the outer lobes protruding radially into the outer flowpath and the inner lobes protruding radially into the inner flowpath, the inner lobes including troughs forming an inner radial portion thereof and the outer lobes including crests forming an outer radial portion thereof, each adjacent inner and outer lobe having a generally radial wall interconnecting the trough and the crest thereof, the crests, the radial walls and the troughs having downstream ends forming a trailing edge of the mixer, one of the troughs and crests having downstream ends which are further extended downstream than the downstream ends of the other of the troughs and crests, the trailing edge of the mixer including a series of tabs on the radial walls, crests and troughs, the tabs on the trailing edge of the radial walls including a radially innermost and a radially outermost tab relative to a central axis of the engine.

DESCRIPTION OF THE DRAWINGS

Reference is now made to the accompanying figures in which.

DETAILED DESCRIPTION

Figure 1:
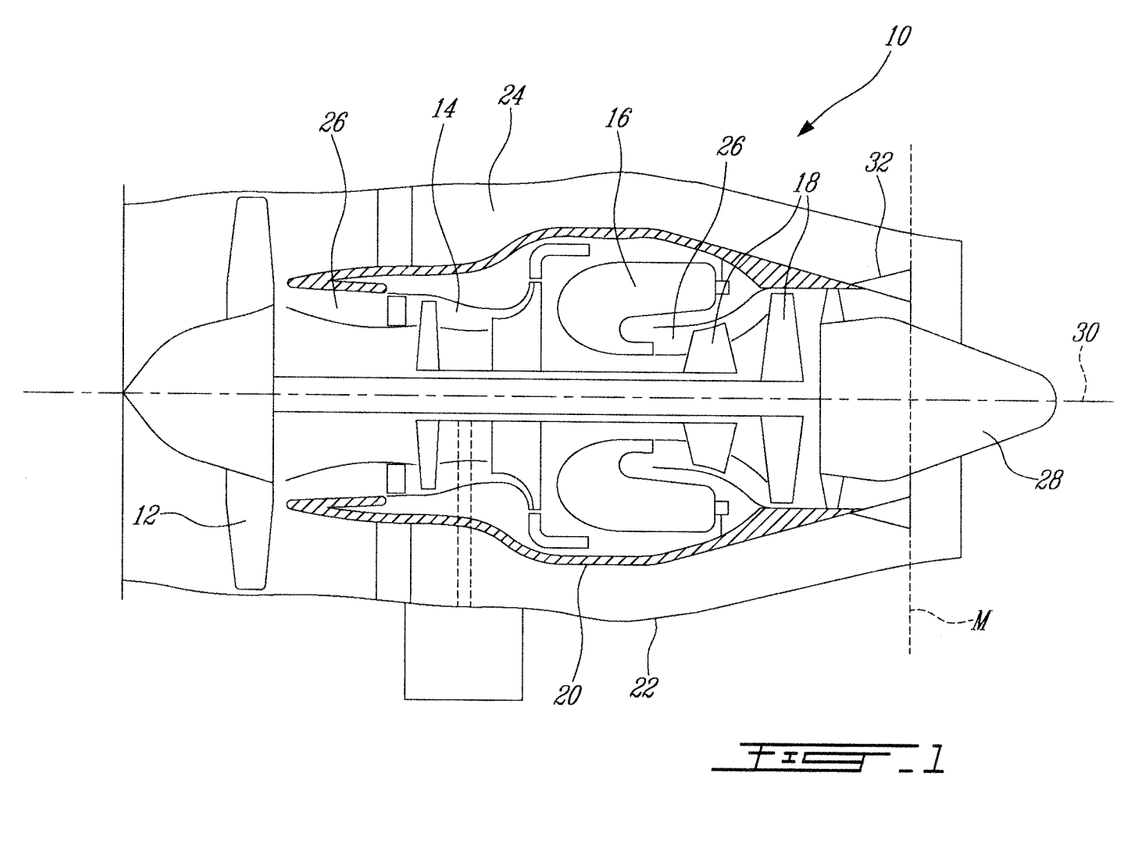
FIG. 1 is a schematic cross-sectional view of a long cowl turbofan engine.

FIG. 1 illustrates a long cowl turbofan gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The gas turbine engine 10 includes a first casing 20 which encloses the turbo machinery of the engine, and a second, outer casing 22 extending outwardly of the first casing 20 such as to define an annular bypass passage 24 therebetween. The air propelled by the fan 12 is split into a first portion which flows around the first casing 20 within the bypass passage 24, and a second portion which flows through a main gas path 26 which is defined within the first casing 20 and allows the flow to circulate through the multistage compressor 14, combustor 16 and turbine section 18 as described above.

At the aft end of the engine 10, an asymmetrical bullet 28 is centered on a longitudinal axis 30 of the engine 10 and defines an inner wall of the main gas path 26 so that the combustion gases flow therearound. An annular exhaust mixer 32 surrounds at least a portion of the bullet 28, the mixer 32 acting as a rearmost portion of the outer wall defining the main gas path 26 and a rearmost portion of the inner wall defining the bypass passage 24. The hot combustion gases from the main gas path 26 and the cooler air from the bypass passage 24 are thus mixed together by the mixer 32 at the mixing plane M (generally located at the exit of the mixer) such as to produce an exhaust yielding a greater thrust. In a long cowl turbofan engine, the casing 22 extends beyond the mixing plane M, and often also beyond the trailing edge of bullet 28 (although the latter is not required).

Figure 2:
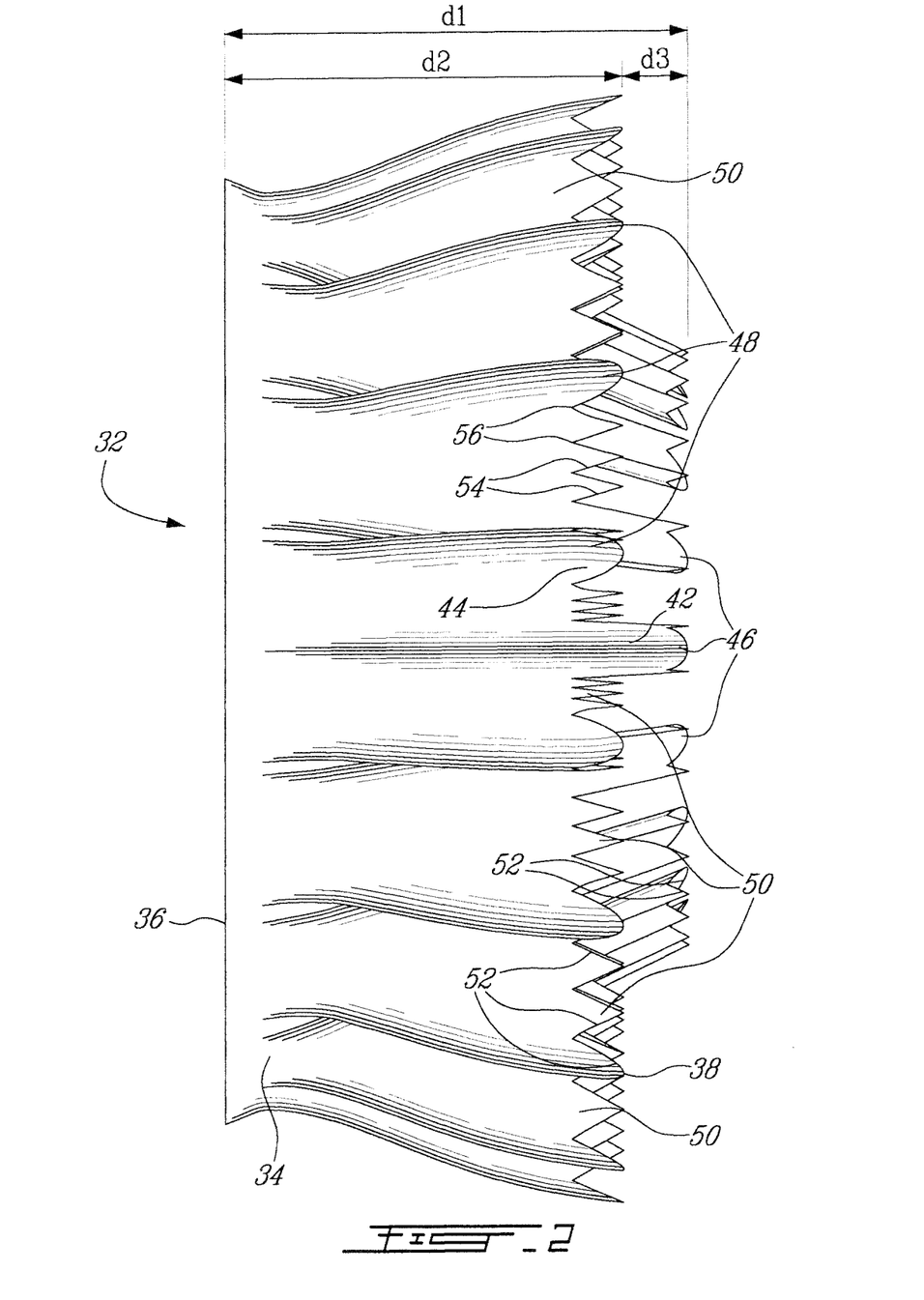
FIG. 2 is a side elevation view of an embodiment of a lobe-shaped exhaust mixer which can be used in an engine such as shown in FIG. 1.

Referring to FIG. 2, the mixer 32 includes an annular wall 34 defining an upstream end 36 of the mixer 32 along which the flows from the main gas path 26 and from the bypass passage 24 are received, and a downstream end 38, i.e. trailing edge, where the two flows meet and are mixed together. The annular wall 34 defines a plurality of circumferentially distributed lobes extending rearwardly from a front frustoconical portion of the mixer 32. The lobes include alternating inner radial and outer radial lobes 42, 44, with the outer lobes 44 extending into the bypass passage 24 and the inner lobes 42 extending into the main gas path 26. In the embodiment shown, each lobe 42, 44 has a radially elongated cross-section and extends longitudinally from the frustoconical portion 40 to the downstream end 38 of the mixer 32. The inner lobes 42 include troughs 46 forming an inner radial portion thereof and the outer lobes 44 include crests 48 forming an outer radial portion thereof. Between each adjacent trough 46 and crest 48, adjacent lobes 42, 44 combine to form a radial wall 50 interconnecting the adjacent trough 46 and crest 48. Each lobe 42, 44 combines to form two parallel radial walls 50. In another embodiment, the radial walls 50 need not be parallel, i.e. they may be straight and non-parallel and/or may not be purely radial, for example, the radial walls 50 may form arcs.

Figure 3:
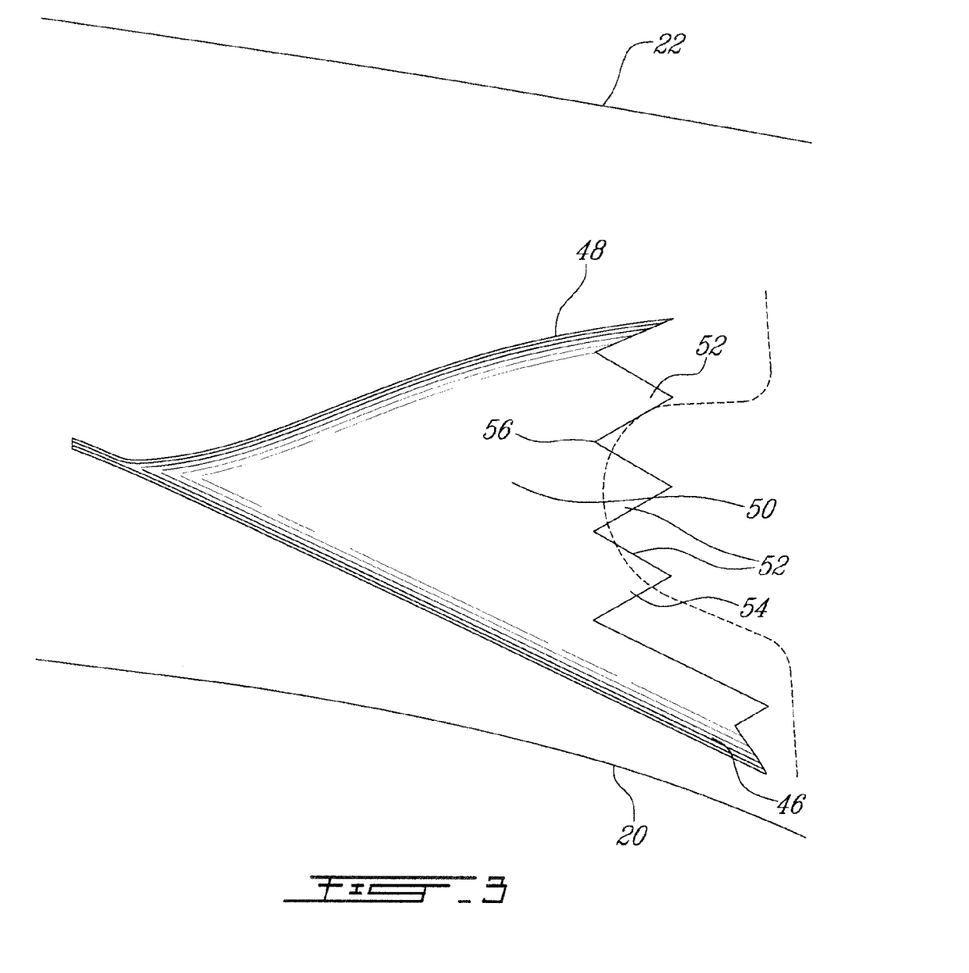
FIG. 3 is a simplified side view illustrating a conventional mixer lobe trailing edge profile superposed over the jagged trailing edge profile of one of the lobes of the exhaust mixer shown in FIG. 2, the conventional lobe trailing edge profile being shown in dotted lines.

The overall shape of the inner and outer lobes 42, 44 of the mixer 32 increases the area of the shear layer between the core and bypass flows to increase mixing of the flows. The lobes 42, 44 also include a series of tabs 52 at the downstream end 38 of the annular wall 34, thereby forming a jagged trailing edge with a plurality of tabs 52 distributed on each radial wall 50 between the troughs 46 and the crests 48, thereby forming circumferentially spaced-apart radial rows of tabs between each trough and crest. As shown in FIG. 3, each wall 50 has a radial row of tabs or teeth defined in the trailing edge thereof, including a radially innermost tab and a radially outermost tab. In contrast, conventional mixing trailing edge profile shown in dotted line in FIG. 3, are provided with radial walls having a smooth and toothless trailing edge extending between adjacent radially spaced-apart crest and trough.

Figure 4:
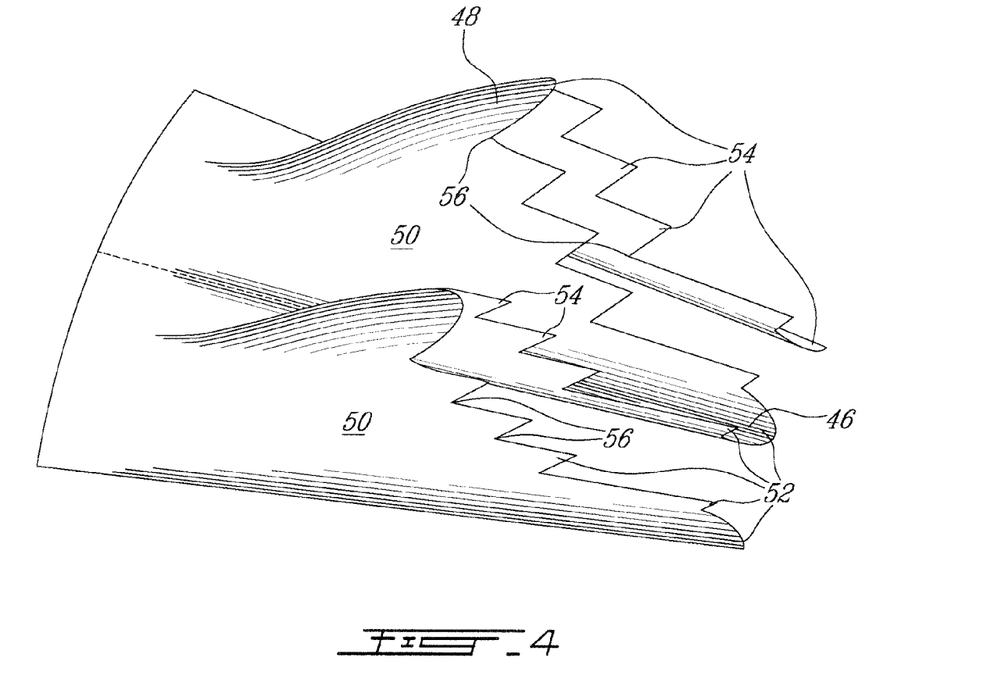
FIG. 4 is an enlarged perspective view of the exhaust mixer shown in FIG. 2 illustrating the trailing edge detail of two of the lobes of the mixer.

As shown in FIGS. 2 to 4, the tabs 52 are defined by protrusions 54 and depressions 56 located between adjacent protrusions 54. The tabs 52 are provided continuously along all the trailing edge of the mixer that is in each trough 46, crest 48 and radial wall 50. In the embodiment shown, the tabs 52 are positioned continuously over the length of the downstream end 38 and each trough 46 and crest 48 include at least one tab 52 thereon and each radial wall 50 includes a plurality of tabs 52 thereon, more particularly, three medium-sized tabs positioned consecutively from the crest 48 and one smaller tab in proximity of the trough 46. Each wall 50 has a row of tabs including a radially innermost tab and a radially outermost tab relative to the central axis of the engine. It is understood that the tabs 52 do not need to be all of the same size and shape. In the embodiment shown, as seen in FIGS. 2 to 4, the tabs 52 protrude in a downstream direction and the tabs 52 positioned on the radial walls 50, trough 46 and crest 48 of lobes 42, 44 are identically configured with respect to the other lobes 42, 44. The tabs 52 may be several times smaller in size than the distance between adjacent troughs 46 and the crests 48.

The mixer 32 should not be limited in scope to the particular configuration, size and shape of the tabs 52. The tabs 52 need not all be the same such that a radial wall 50, for example, may have differently-sized tabs thereon. In addition, the tabs 52 may have different shapes, for example, the tabs 52 may be triangular, circular, elliptical, rectangular, etc. For instance, the tabs 52 may be provided in the form of generally triangular teeth. Furthermore, the lobes 42, 44 may include tabs 52 which protrude not only in a downstream direction, but additionally in a transverse direction with respect to the bypass and core flows, i.e. be angled with respect to the axial flows, in order to increase mixing thereof. In other words that tabs can be bent radially out of the plane define by the local lobe surface where the tab joins the lobe. In yet another embodiment, the tabs 52 need not be continuous over the length of the downstream end 38 of the mixer 32, such that the tabs 52 may be intermittently positioned with flat portions of the downstream end 38 being positioned therebetween adjacent tabs 52. Furthermore, in the embodiment shown, all of the inner radial lobes 42 of the mixer 32 are identical and all of the outer radial lobes 44 of the mixer 32 are identical, however, in other embodiments, the mixer may include different inner radial lobes 42 and/or different outer radial lobes 44, such that, for example, different inner radial or outer radial lobes may be arranged alternately around the circumference of the mixer 32. In the embodiment shown, each lobe 42, 44 has radial walls 50 thereon which are identical, however, in another embodiment, a lobe 42, 44 may be asymmetric, i.e. may have two radial walls 50 with different tab configurations and/or distributions thereon, for example a lobe 42, 44 may have three small circular tabs 52 followed by two large tabs 52 on a first radial wall 50 and have one large angled tab 52 followed by eight tiny triangular tabs 52 on a second radial wall 50. Furthermore, the distribution and configuration, i.e. the number, size and location, of tabs 52 on the troughs 46 and crests 48 may additionally be varied as desired.

Figure 5:
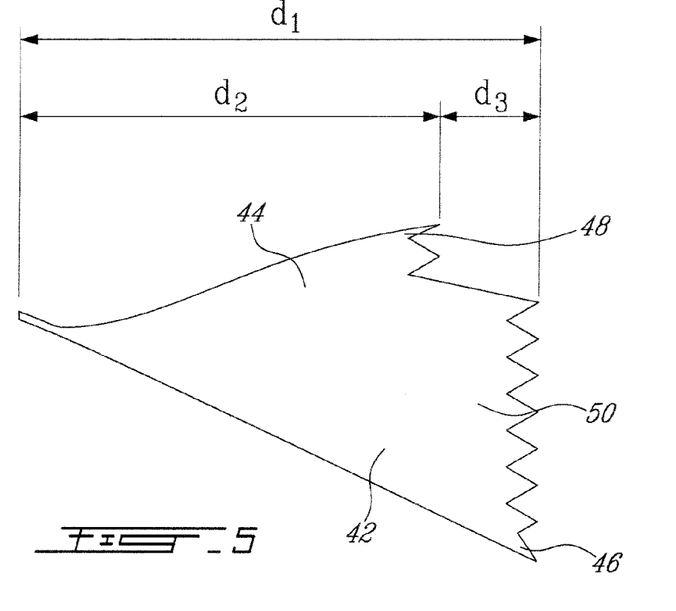
FIGS. 5 to 8 are schematic side views illustrating different cutback configurations of the lobes of a tabbed mixer.
Figure 6:
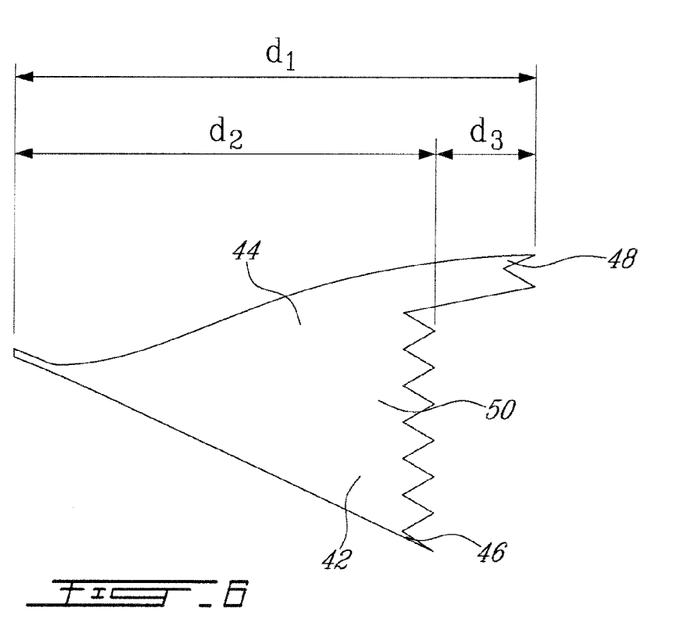
Figure 7:
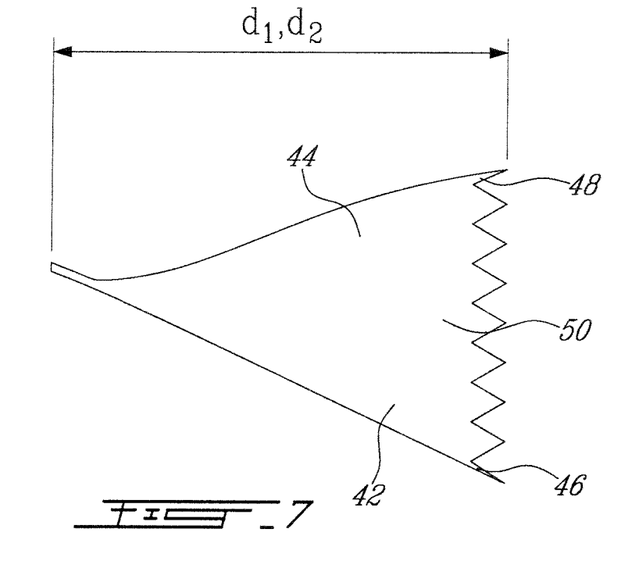
Figure 8:
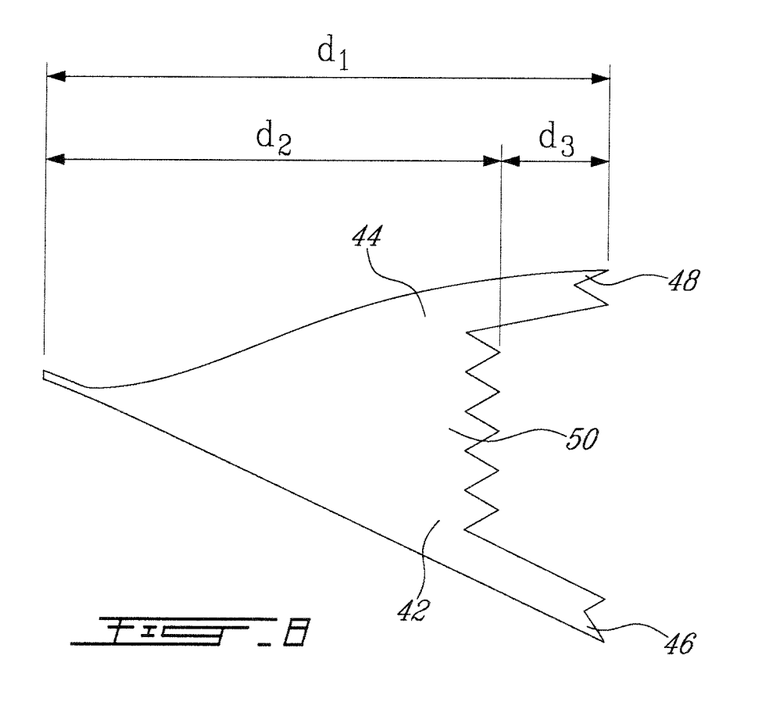

As seen in FIG. 2, in the embodiment shown, the troughs 46 of the mixer 32 extend a distance d1 as measured from the upstream end 36 of the mixer 32 in the downstream direction, i.e. towards the aft or rear of the gas turbine engine 10. The crests 48 and the radial walls 50 of the mixer 32 extend a distance d2 from the plane of the upstream end of the mixer 32 in the downstream direction. The distance d2 is smaller than the distance d1 (i.e. d2<d1), such that the troughs 46 extend a further distance aft than the crests 48 and the radial walls 50. As seen in FIG. 2, this creates a plurality of cutbacks in the downstream end 38 of the exhaust mixer 32, the cutbacks being defined as generalized axial depressions in the downstream end 38 of the mixer 32, wherein at least one of the radial walls 50, trough 46 and crest 48 of adjacent inner and outer radial lobes 42, 44 has a downstream end 38 which is located further upstream than a remainder of the radial walls 50, trough 46 and crest 48 of adjacent inner and outer radial lobes 42, 44. In the embodiment shown, the cutbacks are exemplified by the crests 48 and a significant portion of the radial walls 50, which have downstream ends 38 located a distance d3 upstream of the troughs 46 (as can be seen in FIG. 2, d1=d2+d3). In an alternate embodiment shown schematically in FIG. 5, the radial walls 50 extend a downstream distance d1, such that the cutbacks are defined solely by the crests 48. In another alternate embodiment, depicted schematically in FIG. 6, the troughs 46 and a significant portion of the radial walls 50 extend a downstream distance d2 and the crests 48 extend a downstream distance d1, such that the cutbacks are defined by the afore-mentioned significant portion of the radial walls 50 and the troughs 46. In another embodiment, shown schematically in FIG. 7. the troughs 46, crests 48 and radial walls 50 of the mixer 32 may each extend a substantially equal distance downstream (i.e. d1=d2, such that d3=0) such that cutbacks are not formed in the downstream end 38 of the mixer 32. In yet another embodiment, depicted schematically in FIG. 8, the troughs 46 and crests 48 of the mixer 32 may each extend a substantially equal distance d1 downstream, while the radial walls 50 of the mixer 32 extend a lesser distance d2 downstream than the troughs 46 and crests 48, such that an axial depression is formed in an upstream direction therebetween the troughs 46 and the crests 48 of the lobes 42, 44. The distances d1 and d2 may be varied in order to create cutbacks in the downstream end 38 having different sizes d3, as desired.

The inner 42 and outer lobe 44 configuration of the exhaust mixer 32 serve to generate primary flow structures which provide a primary mixing of the bypass and core fluid flows. Because the tabs 52 are generally smaller than the distance between the troughs 46 and the crests 48, the tabs 52 on the downstream end 38 of the mixer 32 may serve to generate streamwise vorticity along the length of the downstream end 38 smaller in scale than the vorticity caused by the lobed-shape configuration. The tabs 52 therefore generate secondary mixing flow structures to provide a secondary mixing of the bypass and core flows in order to enhance the primary mixing caused by the lobed configuration of the mixer. The primary and secondary mixing together contribute to a greater mixing of the bypass and core flows. As mentioned, the tabs 52 may be angled with respect to the bypass and core flows, in order to further enhance the mixing thereof. In addition, as mentioned, the inner lobes 42 of the mixer 32 may have different tab distributions thereon and the outer lobes 44 may also have different tab distributions thereon, in order to increase or decrease mixing of the bypass and core flows at specific locations of the mixer 32. Furthermore, as mentioned, the lobes 42, 44 may be asymmetric in order to enhance mixing of the bypass and core flows at certain locations of the lobes 42, 44 and/or decrease the mixing of the bypass and core flows at other locations thereof.

The cutbacks in the downstream end 38 of the mixer 32 may be used to generate additional flow structures thereof. As such, the mixing of the bypass and core fluid flows may additionally be increased by providing cutbacks in the trailing edge of the mixer 32.

Due to the improvement in the design of the exhaust mixer with respect to conventional lobed exhaust mixers, enhanced mixing of the bypass and core flows may be provided. Because of the enhanced mixing of the flows, the gas turbine engine may produce a greater thrust. In addition, little or no additional weight is required in order to provide the improved exhaust mixer. It is therefore possible to provide a gas turbine engine achieving a greater thrust while requiring no additional weight thereof.

The above description is meant to be exemplary only, and one skilled in the art will recognize that changes may be made to the embodiments described without departing from the scope of the invention disclosed. For example, the invention may be used with various types of bypass engines where two flow streams are mixed, such as in the exhaust eductor of an auxiliary power unit gas turbine engine, of the type described generally in U.S. Pat. No. 5,265,408 to Sheoran, or U.S. Pat. No. 6,651,929 to Dionne, the entire content of which is incorporated herein by reference. Still other modifications which fall within the scope of the present invention will be apparent to those skilled in the art, in light of a review of this disclosure, and such modifications are intended to fall within the appended claims.

What is claimed is:

1. An exhaust mixer assembly for a gas turbine engine of the type having an outer annular passage coaxially surrounding a core passage, the exhaust mixer assembly comprising a duct surrounding the outer annular passage and extending to a duct exit, the outer and core passages coaxially communicating with a lobed exhaust mixer, the lobed exhaust mixer having and upstream end, a downstream end and a lobed annular wall extending therebetween, the lobed annular wall defining a plurality of circumferentially distributed alternating inner and outer lobes, the lobes having exits defining a mixing plane at which gases in the outer and core passages are mixed, the mixing plane being disposed upstream of the duct exit, the outer lobes protruding radially into the annular outer passage and the inner lobes protruding radially into the core passage, the inner lobes including troughs forming an inner radial portion thereof and the outer lobes including crests forming an outer radial portion thereof, adjacent inner and outer lobes having radial walls interconnecting adjacent troughs and crests, one radial wall being positioned between each trough and each crest, the downstream end of the lobed exhaust mixer including a jagged trailing edge including circumferentially spaced-apart radial rows of tabs extending in a downstream direction from the trailing edge of the radial walls of the inner and outer lobes between the troughs and the crests.

2. The exhaust mixer assembly according to claim 1, wherein each radial row of tabs includes alternating axial protrusions and depressions formed in the trailing edge of the radial walls of the inner and outer lobes of the lobed exhaust mixer, the axial protrusions projecting in a downstream direction relative to the flow of gases through the outer and core passages.

3. The exhaust mixer assembly according to claim 1, wherein the jagged trailing edge of the lobed exhaust mixer further comprises at least one tab extending in a downstream direction from the trailing edge of each trough and crest of the inner and outer lobes.

4. The exhaust mixer assembly according to claim 1 wherein the tabs protrude in a downstream direction relative to the flows through the outer passage and the core passage, and wherein the tabs are positioned continuously over the length of the jagged trailing edge on each radial wall, crest and trough.

5. The exhaust mixer assembly according to claim 1, wherein the radial walls of a same one of the inner and outer lobes have an asymmetrical tab configuration.

6. The exhaust mixer assembly according to claim 5, wherein at least two of the tabs of the jagged trailing edge have different sizes with respect to one another.

7. The exhaust mixer assembly according to claim 6, wherein at least two of the tabs disposed on a same one of the radial walls have different sizes with respect to one another.

8. The exhaust mixer assembly according to claim 1, wherein the inner lobes and the outer lobes have a different tab configuration.

9. The exhaust mixer assembly according to claim 1, wherein at least one of the radial walls, troughs and crests extends downstream beyond the other of the radial walls, troughs and crests to provide at least one cutback in the downstream end of the lobed exhaust mixer.

10. The exhaust mixer according to claim 1, wherein the tabs extend radially at an angle relative to a plane defined by a local lobe surface where the tabs join the lobes.

11. An exhaust mixer assembly for a gas turbine engine of the type having concentric inner and outer flowpaths, the exhaust mixer assembly comprising a duct circumscribing the outer flowpath and having a duct exit, and a lobed exhaust mixer coaxially communicating with the inner and outer flowpaths, the lobed exhaust mixer comprising an upstream end, a downstream end, and an annular wall extending therebetween and defining a plurality of circumferentially distributed alternating inner and outer lobes, the lobes having exits defining a mixing plane at which gases flowing through the outer and inner flowpaths are mixed, the mixing plane being disposed upstream of the duct exit, the outer lobes protruding radially into the outer flowpath and the inner lobes protruding radially into the inner flowpath, the inner lobes including troughs forming an inner radial portion thereof and the outer lobes including crests forming an outer radial portion thereof, each adjacent inner and outer lobe having a generally radial wall interconnecting the trough and the crest thereof, the crests, the radial walls and the troughs having downstream ends forming a trailing edge of the mixer, one of the troughs and crests having downstream ends which are further extended downstream than the downstream ends of the other of the troughs and crests, the trailing edge of the mixer including a series of tabs on the radial walls, crests and troughs, the tabs on the trailing edge of the radial walls including a radially innermost and a radially outermost tab relative to a central axis of the engine.

12. The exhaust mixer assembly according to claim 11, wherein at least a substantial portion of the radial walls have downstream ends which are not extended as far downstream as the one of the troughs and crests, the substantial portion of the radial walls and the other of the troughs and crests forming upstream cutbacks in the trailing edge of the exhaust mixer.

13. The exhaust mixer assembly according to claim 12, wherein the troughs extend a distance $d1$ downstream, the crests and the substantial portion of the radial walls extend a distance $d2$ downstream, the distance $d1$ being greater than the distance $d2$, the cutbacks having a length $d3$ equivalent to the difference between distance $d1$ and $d2$.

14. The exhaust mixer assembly according to claim 11, wherein the downstream ends of the radial walls are extended as far downstream as the one of the troughs and crests, the other of the troughs and crests forming upstream cutbacks in the trailing edge of the exhaust mixer.

* * * * *